United States Patent
Sun et al.

(10) Patent No.: US 8,176,613 B2
(45) Date of Patent: *May 15, 2012

(54) METHOD FOR ATTENUATING DRIVELINE VIBRATIONS

(75) Inventors: Zhaohui Sun, Rochester Hills, MI (US); David Paul Schankin, Harper Woods, MI (US); Dumitru Florin Patrascu, West Bloomfield, MI (US); Austin Richard Gerding, Royal Oak, MI (US)

(73) Assignee: American Axle & Manufacturing, Inc., Detroit, MI (US)

(*) Notice: Subject to any disclaimer, the term of this patent is extended or adjusted under 35 U.S.C. 154(b) by 56 days.

This patent is subject to a terminal disclaimer.

(21) Appl. No.: 12/839,715

(22) Filed: Jul. 20, 2010

(65) Prior Publication Data
US 2010/0281673 A1 Nov. 11, 2010

Related U.S. Application Data

(62) Division of application No. 11/363,143, filed on Feb. 27, 2006, now Pat. No. 7,774,911.

(51) Int. Cl.
*B23Q 17/00* (2006.01)
(52) U.S. Cl. .................................. 29/407.07
(58) Field of Classification Search ............... 29/407.07, 29/896.93, 428, 888, 889.61; 464/127, 180, 464/181, 183; 180/381, 380, 379, 378; 188/372, 188/379
See application file for complete search history.

(56) References Cited

U.S. PATENT DOCUMENTS

| | | |
|---|---|---|
| 2,001,166 A | 5/1935 | Swennes |
| 2,751,765 A | 6/1956 | Rowland et al. |
| 3,052,107 A | 9/1962 | Kempf |
| 3,075,406 A | 1/1963 | Butler et al. |
| 3,659,434 A | 5/1972 | Wolfe |
| 4,014,184 A | 3/1977 | Stark |
| 4,207,957 A | 6/1980 | Sivers et al. |
| 4,844,193 A | 7/1989 | Veselica et al. |
| 4,909,361 A | 3/1990 | Stark et al. |
| 5,056,763 A | 10/1991 | Hamada et al. |
| 5,326,324 A | 7/1994 | Hamada |
| 5,904,622 A | 5/1999 | Breese et al. |
| 5,976,021 A | 11/1999 | Stark et al. |
| 6,752,722 B2 | 6/2004 | Armitage et al. |
| 6,874,228 B2 | 4/2005 | Armitage et al. |
| 7,214,135 B2 | 5/2007 | Laskey et al. |
| 7,533,756 B2 | 5/2009 | Patrascu et al. |
| 7,774,911 B2 * | 8/2010 | Sun et al. .................. 29/407.07 |

OTHER PUBLICATIONS

Foulkes et al., "Vibration Characteristics of Cardboard Inserts in Shells," SAE International 2003. Sun et al., "FEA Studies on Axle System Dynamics," SAE 2002 World Congress, Detroit, MI, Mar. 2002.
Sun et al., "Balancing Competing Design Imperatives to Achieve Overall Driveline NVH Performance Objectives," SAE 2005 Noise and Vibration Conference and Exhibition, Traverse City, MI, May 2005.

* cited by examiner

*Primary Examiner* — John C Hong
(74) *Attorney, Agent, or Firm* — Harness, Dickey & Pierce, P.L.C.

(57) ABSTRACT

A method for attenuating vibration in a driveline having a shaft assembly that transmits torque between first and second driveline components. The shaft assembly can have a hollow shaft member and at least one liner. The liner has a mass and a stiffness that are tuned such that the liner is a tuned resistive absorber for attenuating shell mode vibrations as well as at least one of a tuned reactive absorber for attenuating bending mode vibrations and a tuned reactive absorber for attenuating torsion mode vibrations. The tuned liner is inserted into the shaft member.

38 Claims, 6 Drawing Sheets

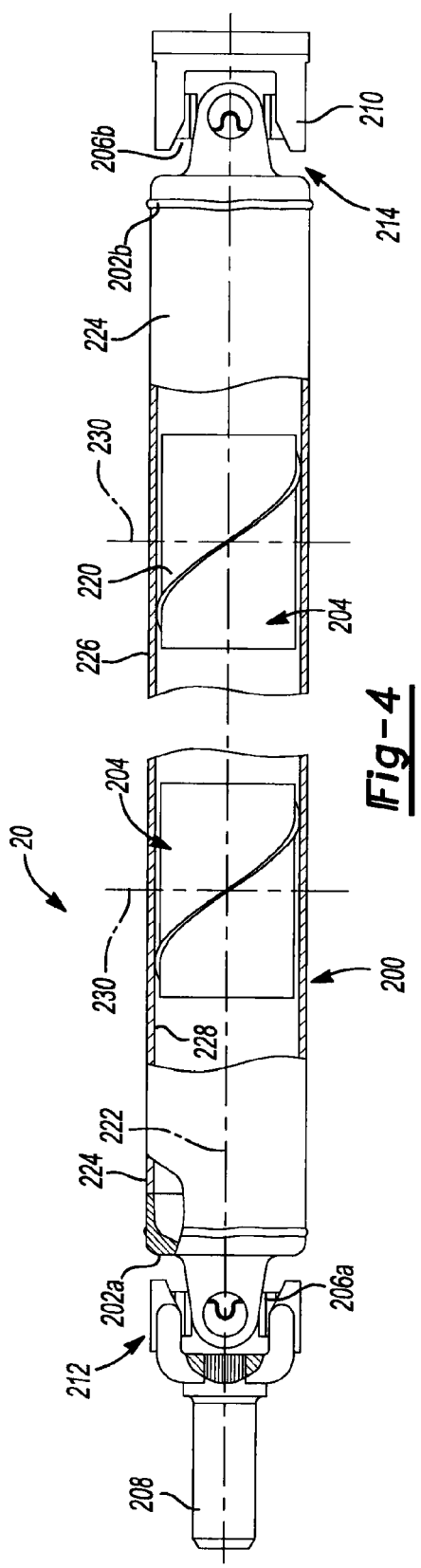
_Fig-4_
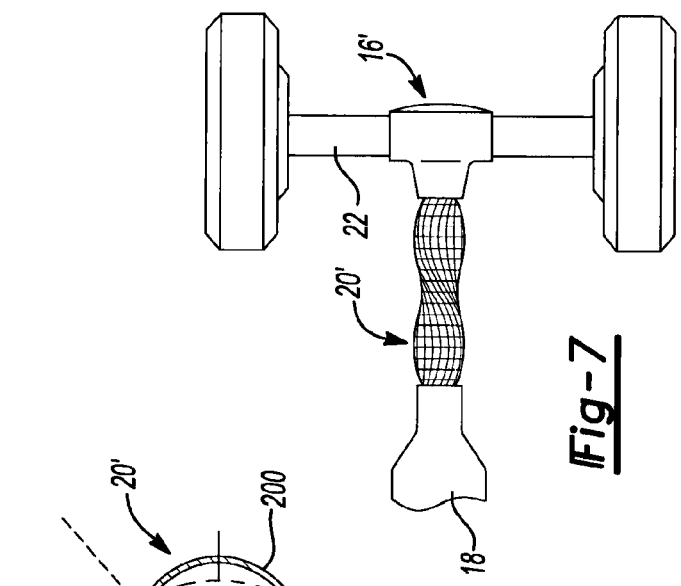
_Fig-7_
_Fig-6_
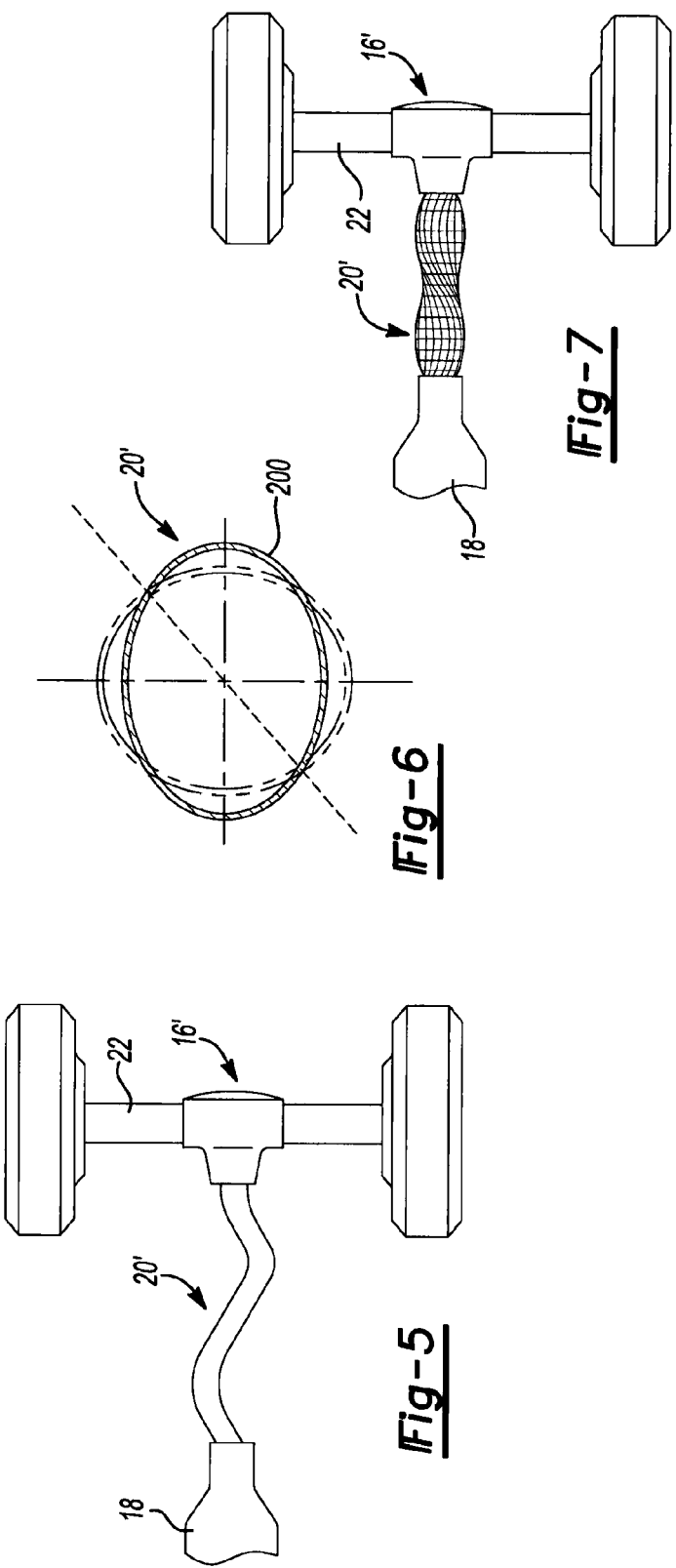
_Fig-5_

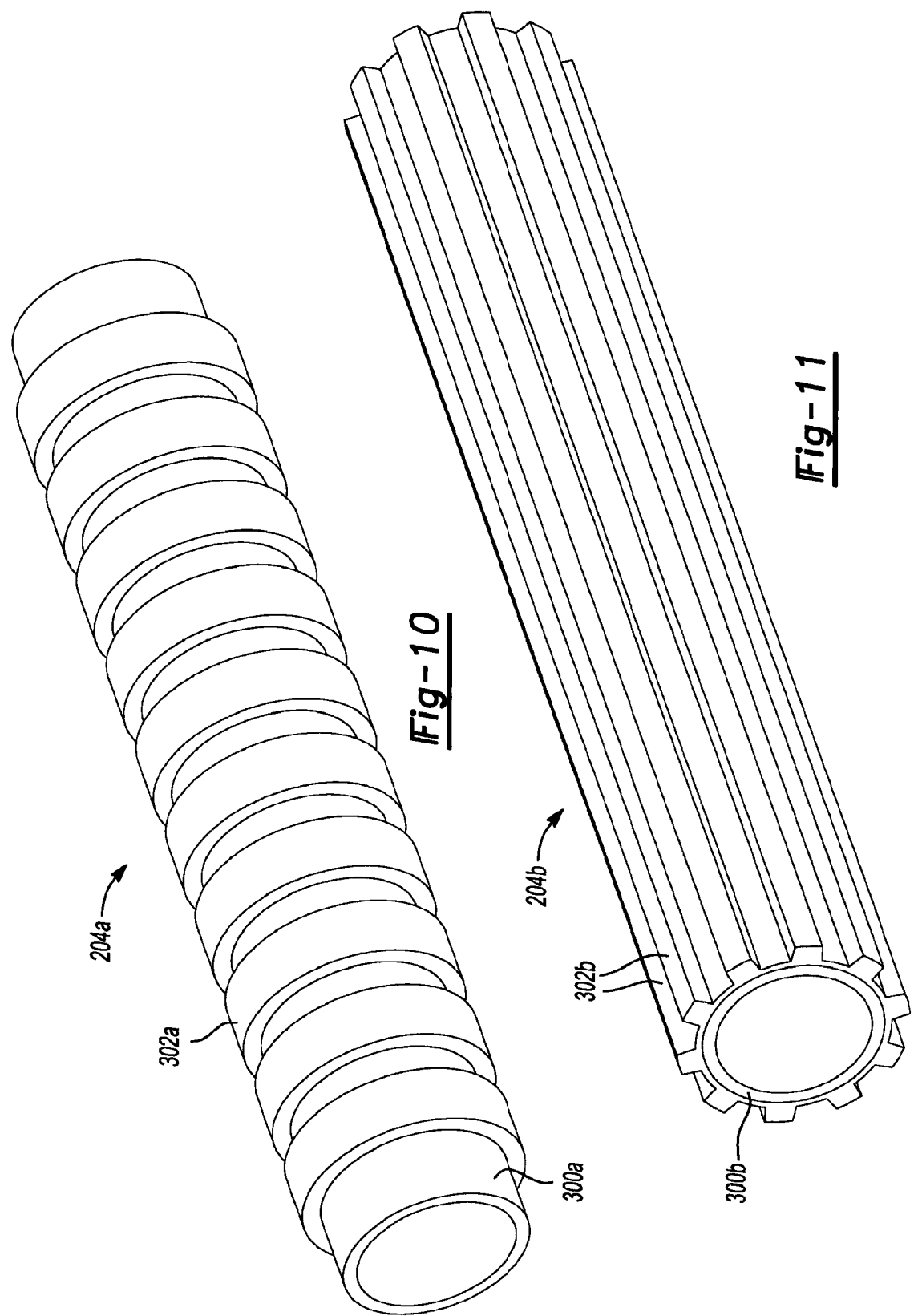

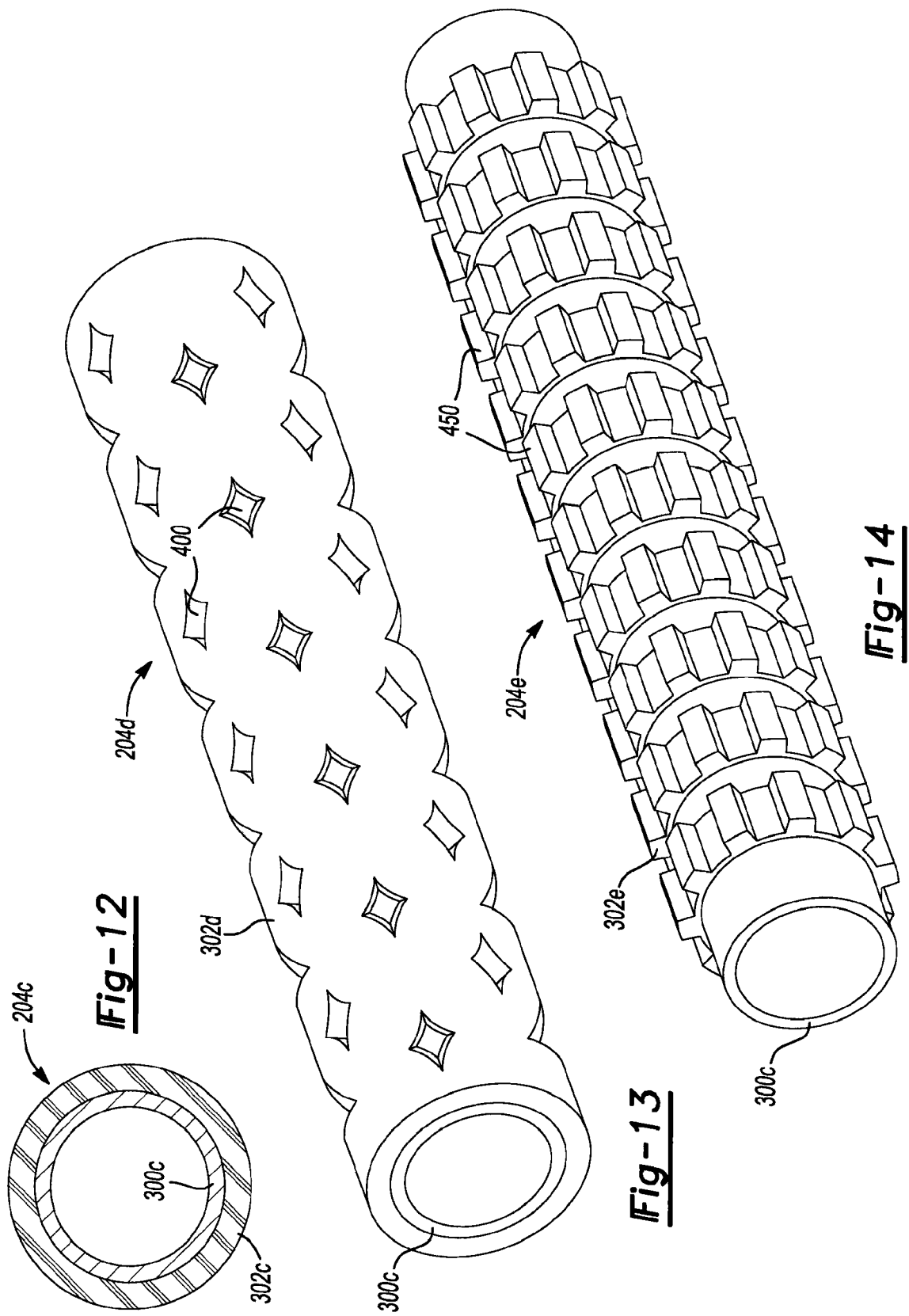

METHOD FOR ATTENUATING DRIVELINE VIBRATIONS

CROSS-REFERENCE TO RELATED APPLICATIONS

This application is a division of U.S. Ser. No. 11/363,143 entitled "Method for Attenuating Driveline Vibrations" and filed Feb. 27, 2006 (now U.S. Pat. No. 7,774,911), the disclosure of which is hereby incorporated by reference as if fully set forth in detail herein.

INTRODUCTION

The present invention generally relates to shaft assemblies for transmitting rotary power in a driveline and more particularly to a method for attenuating driveline vibrations transmitted through a shaft assembly.

The consumers of modern automotive vehicles are increasingly influenced in their purchasing decisions and in their opinions of the quality of a vehicle by their satisfaction with the vehicle's sound quality. In this regard, consumers increasingly expect the interior of the vehicle to be quiet and free of noise from the power train and driveline. Consequently, vehicle manufacturers and their suppliers are under constant pressure to reduce noise to meet the increasingly stringent expectations of consumers.

Driveline components and their integration into a vehicle typically play a significant role in sound quality of a vehicle as they can provide the forcing function that excites specific driveline, suspension and body resonances to produce noise. Since this noise can be tonal in nature, it is usually readily detected by the occupants of a vehicle regardless of other noise levels. Common driveline excitation sources can include driveline imbalance and/or run-out, fluctuations in engine torque, engine idle shake, and motion variation in the meshing gear teeth of the hypoid gear set (i.e., the pinion gear and the ring gear of a differential assembly).

Motion variation is the slight variation in angular displacement between the input and output gears of a gear set. This variation is typically very small and can be on the order of tens of millionths of an inch (measured tangentially at the pitch line of the gear) for a modern automotive differential assembly. Motion variation is typically not constant (e.g., it will typically vary as a function of load, temperature, gearset build position, and break-in wear) and moreover, it cannot be reduced beyond certain levels without severe economic penalties.

Propeller (prop) shafts are typically employed to transmit rotary power in a driveline. Modern automotive propshafts are commonly formed of relatively thin-walled steel or aluminum tubing and as such, can be receptive to various driveline excitation sources. The various excitation sources can typically cause the propshaft to vibrate in a bending (lateral) mode, a torsion mode and a shell mode. Bending mode vibration is a phenomenon wherein energy is transmitted longitudinally along the shaft and causes the shaft to bend at one or more locations. Torsion mode vibration is a phenomenon wherein energy is transmitted tangentially through the shaft and causes the shaft to twist. Shell mode vibration is a phenomenon wherein a standing wave is transmitted circumferentially about the shaft and causes the cross-section of the shaft to deflect or bend along one or more axes.

Several techniques have been employed to attenuate vibrations in propshafts including the use of weights and liners. U.S. Pat. No. 2,001,166 to Swennes, for example, discloses the use of a pair of discrete plugs or weights to attenuate vibrations. The weights of the '166 patent are frictionally engaged to the propshaft at experimentally-derived locations and as such, it appears that the weights are employed as a resistive means to attenuate bending mode vibration. As used herein, resistive attenuation of vibration refers to a vibration attenuation means that deforms as vibration energy is transmitted through it (i.e., the vibration attenuation means) so that the vibration attenuation means absorbs (and thereby attenuates) the vibration energy. While this technique can be effective, the additional mass of the weights can require changes in the propshaft mounting hardware and/or propshaft geometry (e.g., wall thickness) and/or can change the critical speed of the propshaft. Moreover, as the plugs tend to be relatively short, they typically would not effectively attenuate shell mode vibration or torsion mode vibration.

U.S. Pat. No. 3,075,406 to Butler Jr., et al. appears to disclose a single damper that is inserted to a hollow shaft. The damper includes a pair of resilient members, which frictionally engage the interior surface of the hollow shaft, and a metal bar that is suspended within the interior of the hollow shaft by the resilient members. The '406 patent explains that at the resonant vibration frequency of the propeller shaft, "the motion of the mass is out of phase with the radial motion of the tubular propeller shaft". Accordingly, the damper of the '406 patent appears to be a reactive damper for attenuating bending mode vibration. As used herein, reactive attenuation of vibration refers to a mechanism that can oscillate in opposition to the vibration energy to thereby "cancel out" a portion of the vibration energy. The damper of the '406 patent appears to be ineffective at attenuating torsion mode vibration and shell mode vibration due to its relatively short length and its contact with a relatively small portion of the interior surface of the propshaft.

U.S. Pat. No. 2,751,765 to Rowland et al., U.S. Pat. No. 4,014,184 to Stark and U.S. Pat. Nos. 4,909,361 and 5,976,021 to Stark et al. disclose hollow liners for a propshaft. The '765 and '184 patents appear to disclose hollow multi-ply cardboard liners that are press-fit to the propshaft; the cardboard liners are relatively long and appear to extend substantially coextensively with the hollow shaft. The '361 and '021 patents appear to disclose liners having a hollow cardboard core and a helical retaining strip that extends a relatively short distance (e.g., 0.03 inch) from the outside diameter of the core. The retaining strip has high frictional properties to frictionally engage the propshaft. Accordingly, the liners of the '765, '184, '361 and '021 patents appear to disclose a resistive means for attenuating shell mode vibration. These liners, however, do not appear to be suitable for attenuating bending mode vibration or torsion mode vibration.

In view of the foregoing, there remains a need in the art for an improved method for damping various types of vibrations in a hollow shaft. This method facilitates the damping of shell mode vibration as well as the damping of bending mode vibration and/or torsion mode vibration.

SUMMARY

In one form, the present teachings provide a method for manufacturing a shaft assembly of a driveline system. The driveline system can include a first driveline component and a second driveline component and the shaft assembly can be configured to transmit torque between the first driveline component and the second driveline component. The method can include: providing a hollow shaft member; and inserting at least one liner into the shaft member, the at least one liner being configured for damping shell mode vibrations in the shaft member by an amount that is greater than or equal to about 2%, the at least one liner also being configured for damping bending mode vibrations in the shaft member, the at least one liner being tuned to within about ±20% of a bending mode natural frequency of the shaft assembly as installed in the driveline system.

In another form, the present teachings provide a method for manufacturing a shaft assembly of a driveline system. The driveline system can include a first driveline component and a second driveline component and the shaft assembly can be configured to transmit torque between the first driveline component and the second driveline component. The method can include: providing a hollow shaft member; and inserting at least one liner into the shaft member, the at least one liner being configured for damping shell mode vibrations in the shaft member by an amount that is greater than or equal to about 2%, the at least one liner also being tuned to within about ±20% of a natural frequency of the driveline system in a torsion mode.

In another form, the present teachings provide a method for manufacturing a shaft assembly of a driveline system. The driveline system can include a first driveline component and a second driveline component and the shaft assembly can be configured to transmit torque between the first driveline component and the second driveline component. The method can include: providing a hollow shaft member; tuning a mass and a stiffness of at least one liner; and inserting the at least one liner into the shaft member. The at least one liner is a tuned resistive absorber for attenuating shell mode vibrations and is a tuned reactive absorber for attenuating bending mode vibrations.

In still another form, the present teachings provide a method for manufacturing a shaft assembly of a driveline system. The driveline system can include a first driveline component and a second driveline component and the shaft assembly can be configured to transmit torque between the first driveline component and the second driveline component. The method can include: providing a hollow shaft member; tuning a mass and a stiffness of at least one liner; and inserting the at least one liner into the shaft member. The at least one liner is a tuned resistive absorber for attenuating shell mode vibrations and is a tuned reactive absorber for attenuating torsion mode vibrations.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 4 is a top, partially cut away view of the propshaft assembly;

FIG. 5 is a schematic illustration of a portion of a driveline illustrating an undamped propshaft vibrating in a second bending mode;

FIG. 6 is a sectional view of a portion of the undamped propshaft taken perpendicular to the longitudinal (rotational) axis of the propshaft illustrating the propshaft vibrating in a first shell mode;

FIG. 7 is a schematic illustration of a portion of a driveline illustrating an undamped propshaft vibrating in a torsion mode;

FIG. 10 is a perspective view of a second liner for damping a propshaft in accordance with the teachings of the present disclosure;

FIG. 11 is a perspective view of a third liner for damping a propshaft in accordance with the teachings of the present disclosure;

FIG. 12 is a section view of a fourth liner for damping a propshaft in accordance with the teachings of the present disclosure;

FIG. 13 is a perspective view of a fifth liner for damping a propshaft in accordance with the teachings of the present disclosure; and FIG. 14 is a perspective view of a sixth liner for damping a propshaft in accordance with the teachings of the present disclosure.

DETAILED DESCRIPTION OF THE VARIOUS EMBODIMENTS

Figure 1:
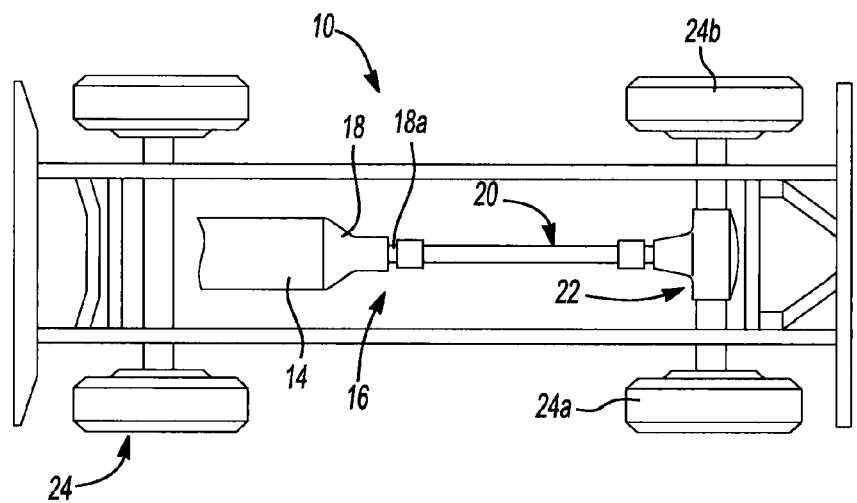
FIG. 1 is a schematic illustration of an exemplary vehicle constructed in accordance with the teachings of the present disclosure.

With reference to FIG. 1 of the drawings, an exemplary vehicle constructed in accordance with the teachings of the present disclosure is generally indicated by reference numeral 10. The vehicle 10 can include an engine 14 and a driveline 16. The driveline 16 can include a transmission 18, a propshaft assembly 20, a rear axle 22 and a plurality of wheels 24. The engine 14 can produce rotary power that can be transmitted to the transmission 18 in a conventional and well known manner. The transmission 18 can be conventionally configured and can include a transmission output shaft 18*a* and a gear reduction unit (not specifically shown). As is well known in the art, the gear reduction unit can change the speed and torque of the rotary power provided by the engine such that a rotary output of the transmission 18 (which can be transmitted through the transmission output shaft 18*a*) can have a relatively lower speed and higher torque than that which was input to the transmission 18. The propshaft assembly 20 can be coupled for rotation with the transmission output member 18*a* to permit drive torque to be transmitted from the transmission 18 to the rear axle 22 where can be selectively apportioned in a predetermined manner to the left and right rear wheels 24*a* and 24*b*, respectively.

It will be appreciated that while the vehicle in the particular example provided employs a driveline with a rear-wheel drive arrangement, the teachings of the present disclosure have broader applicability. In this regard, a shaft assembly constructed in accordance with the teachings of the present disclosure may interconnect a first driveline component with a second driveline component to transmit torque therebetween. In the context of an automotive vehicle, the driveline components could be a transmission, a transfer case, a viscous coupling, an axle assembly, or a differential, for example.

Figure 2:
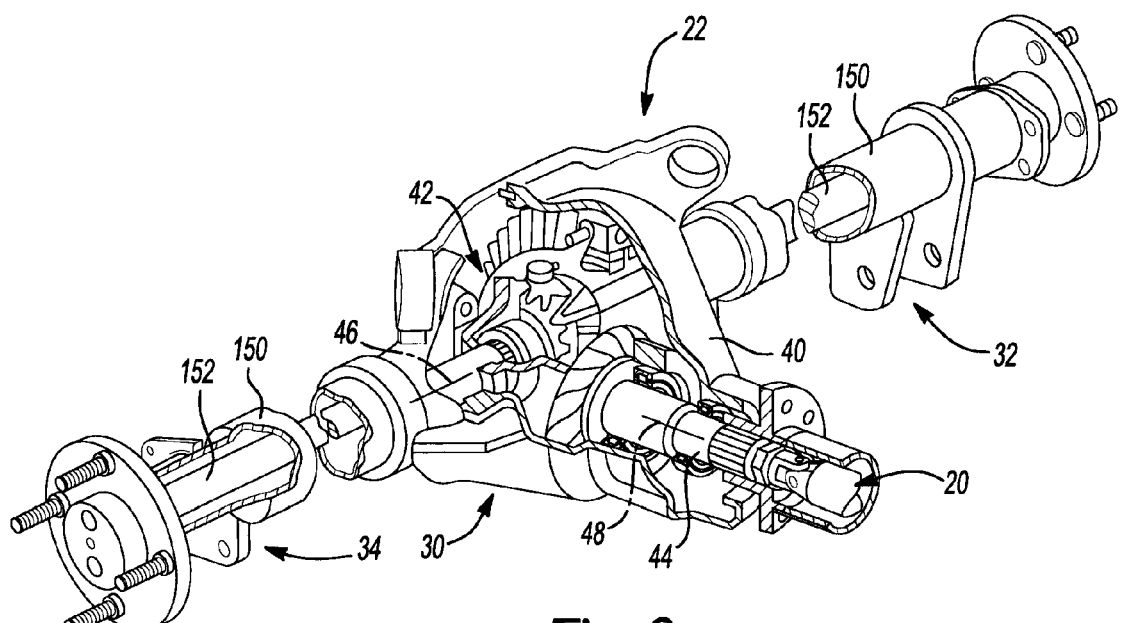
FIG. 2 is a top partially cut-away view of a portion of the vehicle of FIG. 1 illustrating the rear axle and the propshaft assembly in greater detail.

With reference to FIG. 2, the rear axle 22 can include a differential assembly 30, a left axle shaft assembly 32 and a right axle shaft assembly 34. The differential assembly 30 can include a housing 40, a differential unit 42 and an input shaft assembly 44. The housing 40 can support the differential unit 42 for rotation about a first axis 46 and can further support the input shaft assembly 44 for rotation about a second axis 48 that is perpendicular to the first axis 46.

Figure 3:
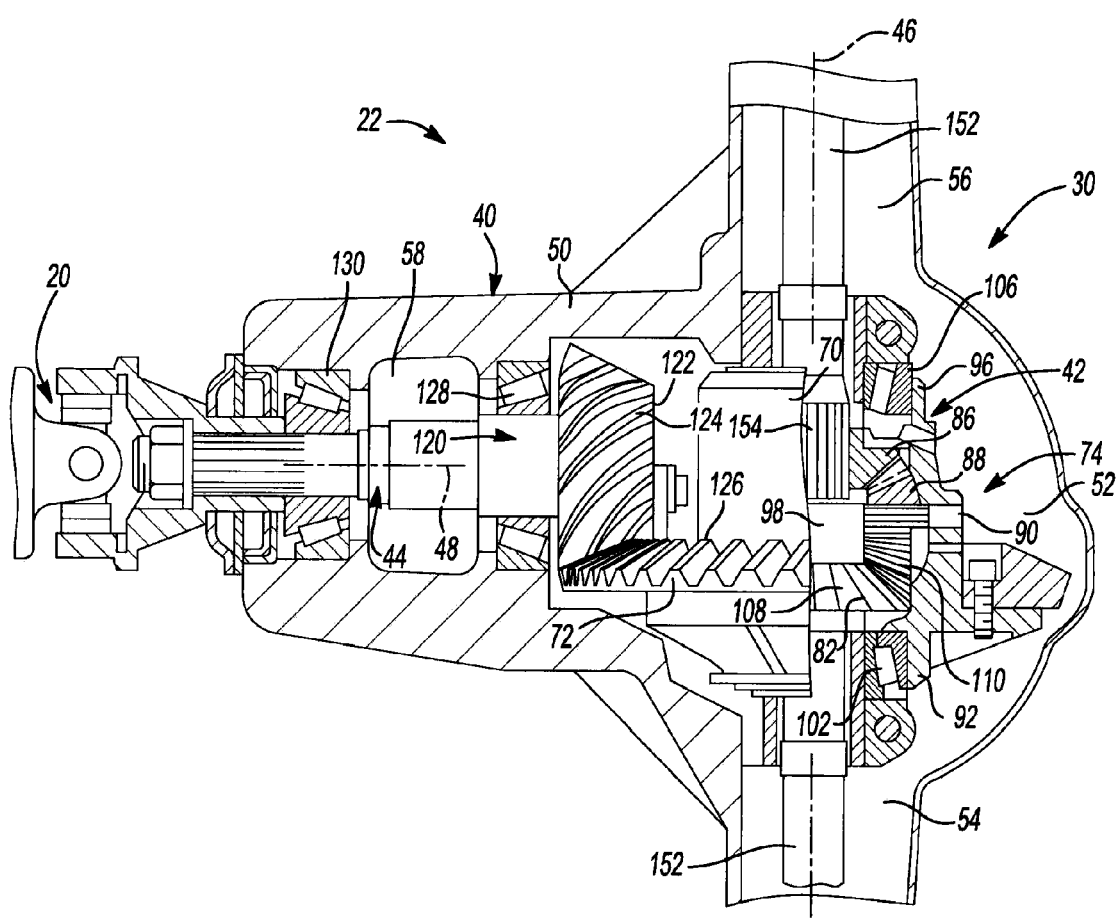
FIG. 3 is a sectional view of a portion of the rear axle and the propshaft assembly.

With additional reference to FIG. 3, the housing 40 can be formed in a suitable casting process and thereafter machined as required. The housing 40 can includes a wall member 50 that can define a central cavity 52 that can have a left axle aperture 54, a right axle aperture 56, and an input shaft aperture 58. The differential unit 42 can be disposed within the central cavity 52 of the housing 40 and can include a case 70, a ring gear 72, which can be fixed for rotation with the case 70, and a gearset 74 that can be disposed within the case 70. The gearset 74 can include first and second side gears 82 and 86 and a plurality of differential pinions 88, which can be rotatably supported on pinion shafts 90 that can be mounted to the case 70. The case 70 can include a pair of trunnions 92 and 96 and a gear cavity 98. A pair of bearing assemblies 102 and 106 can support the trunnions 92 and 96, respectively, for rotation about the first axis 46. The left and right axle assemblies 32 and 34 can extend through the left and right axle apertures 54 and 56, respectively, where they can be coupled for rotation about the first axis 46 with the first and second side gears 82 and 86, respectively. The case 70 can be operable for supporting the plurality of differential pinions 88 for rotation within the gear cavity 98 about one or more axes that can be perpendicular to the first axis 46. The first and second side gears 82 and 86 each include a plurality of teeth 108 which meshingly engage teeth 110 that are formed on the differential pinions 88.

The input shaft assembly 44 can extend through the input shaft aperture 58 where it can be supported in the housing 40 for rotation about the second axis 48. The input shaft assembly 44 can include an input shaft 120, a pinion gear 122 having a plurality of pinion teeth 124 that meshingly engage the teeth 126 that are formed on the ring gear 72, and a pair of bearing assemblies 128 and 130 that can cooperate with the housing 40 to rotatably support the input shaft 120. The input shaft assembly 44 can be coupled for rotation with the propshaft assembly 20 and can be operable for transmitting drive torque to the differential unit 42. More specifically, drive torque received by the input shaft 120 can be transmitted by the pinion teeth 124 to the teeth 126 of the ring gear 72 such that drive torque is distributed through the differential pinions 88 to the first and second side gears 82 and 86.

The left and right axle shaft assemblies 32 and 34 can include an axle tube 150 that can be received into the associated axle aperture 54 and 56, respectively, and an axle half-shaft 152 that can be supported for rotation in the axle tube 150 about the first axis 46. Each of the axle half-shafts 152 can include an externally splined portion 154 that can meshingly engage a mating internally splined portion (not specifically shown) that can be formed into the first and second side gears 82 and 86, respectively.

With reference to FIG. 4, the propshaft assembly 20 can include a shaft structure 200, first and second trunnion caps 202a and 202b, at least one liner 204, first and second spiders 206a and 206b, a yoke assembly 208 and a yoke flange 210. The first and second trunnion caps 202a and 202b, the first and second spider 206a and 206b, the yoke assembly 208 and the yoke flange 210 can be conventional in their construction and operation and as such, need not be discussed in detail. Briefly, the first and second trunnion caps 202a and 202b can be fixedly coupled to the opposite ends of the shaft structure 200, typically via a weld. Each of the first and second spiders 206a and 206b can be coupled to an associated one of the first and second trunnion caps 202a and 202b and to an associated one of the yoke assembly 208 and the yoke flange 210. The yoke assembly 208, first spider 206a, and first trunnion cap 202a can collectively form a first universal joint 212, while the yoke flange 210, second spider 206b and second trunnion cap 202b can collectively form a second universal joint 214.

A splined portion of the yoke assembly 208 can be rotatably coupled with the transmission output shaft 18a and the yoke flange 210 can be rotatably coupled with the input shaft 120. The first and second universal joints 212 and 214 can facilitate a predetermined degree of vertical and horizontal offset between the transmission output shaft 18a and the input shaft 120.

The shaft structure 200 can be generally cylindrical, having a hollow central cavity 220 and a longitudinal axis 222. The shaft structure 200 can be formed of any suitable material. In the particular example provided, the shaft structure 200 is formed of welded seamless 6061-T6 aluminum tubing conforming to ASTM B-210. Also in the particular embodiment illustrated, the shaft structure 200 is uniform in diameter and cross-section between the ends 224, but it will be appreciated that the shaft structure could be otherwise formed. For example, the ends 224 of the shaft structure 200 could be necked-down (e.g., via rotary swaging) relative to the central portion 226 of the shaft structure 200.

With reference to FIGS. 5 through 7, it will be appreciated that an undamped propshaft assembly 20' (e.g., the propshaft assembly 20 without the at least one liner 204) could be susceptible to several types of vibration. In FIG. 5, for example, the undamped propshaft assembly 20' is illustrated as vibrating at a bending mode natural frequency (i.e., a second bending mode (n=2) natural frequency) of the propshaft assembly 20' as installed in the driveline 16'. In this regard, those of ordinary skill in the art will appreciate that the bending mode natural frequency is a function of not only the propshaft assembly 20', but also of the "boundary conditions" (i.e., the manner in which the propshaft assembly 20' is coupled to the driveline 16'). Consequently, the term "propshaft assembly as installed in the driveline" will be understood to include not only the shaft assembly but also the boundary conditions under which the shaft assembly is installed to the two driveline components.

In FIG. 6, the propshaft assembly 20' is illustrated as vibrating at a shell mode natural frequency (i.e., a first (n=1) shell mode natural frequency) of the shaft structure 200.

In FIG. 7, the propshaft assembly 20' is illustrated as vibrating at a natural torsion frequency of the driveline 16' in a torsion mode (i.e., a first (n=1) torsion mode). In this regard, those of ordinary skill in the art will appreciate that the natural torsion frequency is a function of not only the propshaft assembly 20', but also of the first and second driveline components (e.g., the transmission 18 and the rear axle 22) to which the propshaft assembly is coupled.

Returning to FIG. 4, the propshaft assembly 20 of the particular example provided includes two liners 204 that are identically configured. It will be appreciated in view of this disclosure, however, that other quantities of liners 204 may be utilized and that the liners 204 need not be identically configured (i.e., each insert 204 can have different damping characteristics and a first one of the liners 204 can be different from a second one of the liners 204).

Figure 8:
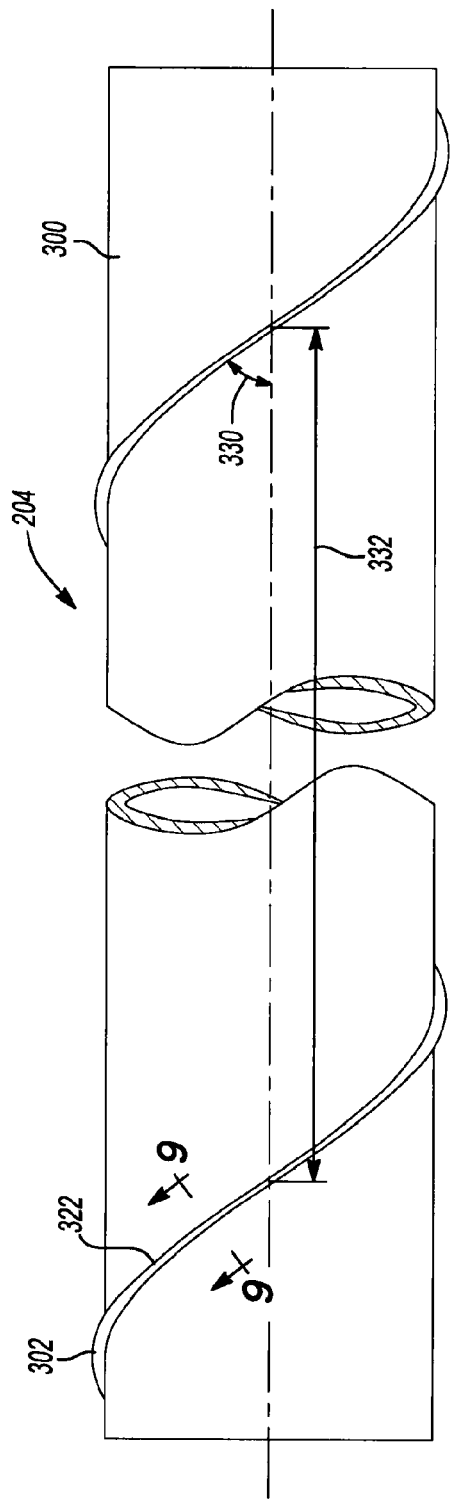
FIG. 8 is a side view of a liner for damping a propshaft in accordance with the teachings of the present disclosure.
Figure 9:
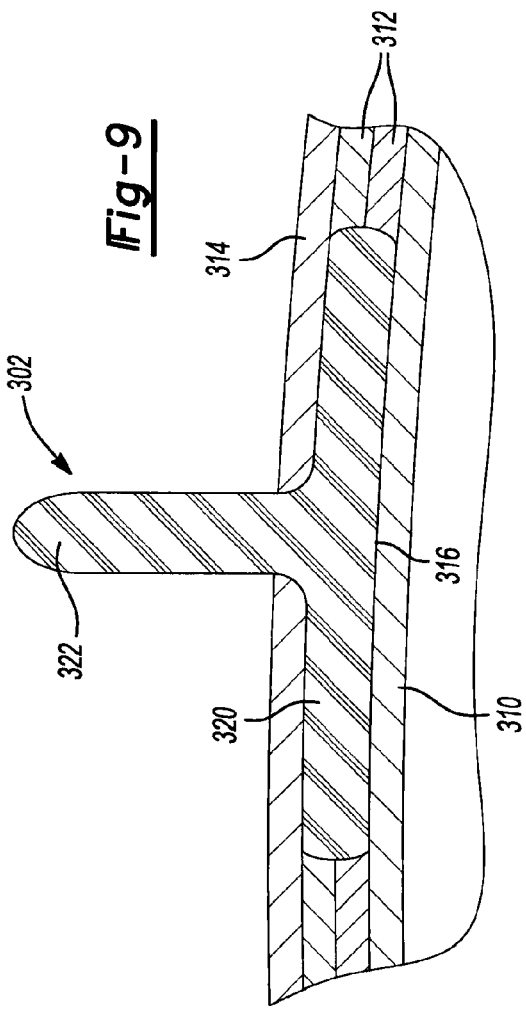
FIG. 9 is a section view of a portion of the liner illustrating the coupling of the resilient member to the structural portion in more detail.

With additional reference to FIGS. 8 and 9, the liner 204 can be constructed in a manner that is similar to that which is described in U.S. Pat. No. 4,909,361, the disclosure of which is hereby incorporated by reference as if fully set forth in its entirety herein. Briefly, the liner 204 can include a structural portion 300 and one or more resilient members 302 that are coupled to the structural portion 300. The liners 204 are sized such that the structural portion 300 is smaller than the inner diameter of the shaft member 200 but the resilient member(s) 302 is/are sized to frictionally engage the inner diameter of the shaft member 200.

In the example provided, the structural portion 300 includes a hollow core 310, one or more intermediate members 312 and a cover member 314. The core 310 can be formed of a fibrous material, such as cardboard. In the particular example provided, the core 310 is formed of a suitable number of plies of helically wound paperboard. The intermediate members 312 can also be formed of a paperboard and can be helically wound onto and adhered (via a suitable adhesive) to the core 310 in a manner that forms one or more helical gaps 316. In the particular example provided, one helical gap 316 is formed. It will be appreciated that the structural portion 300 could be formed of any appropriate material, including cardboard, plastic resins, carbon fiber, fiberglass, metal and combinations thereof. It will also be appreciated that the structural portion 300 need not include an intermediate member 312 or a cover member 314 and need not define one or more gaps 316. It will further be appreciated that the gaps 316, if used, need not be helical in shape but rather could be formed in other manners, such as circumferentially or longitudinally.

The resilient members 302 can be formed of an appropriate elastomer and can include a base 320 and one or more lip members 322 that can be coupled to the base 320. The base 320 can be fixedly coupled to the structural portion 300 via a suitable adhesive such that the lip members 322 extend radially outwardly therefrom. The cover member 314 can be wrapped over the intermediate member(s) 312 and the base 320 and can be employed to further secure the resilient members 302 to the structural portion 300.

It will be appreciated from this disclosure that where two or more resilient members 302 are employed, the resilient members 302 can be formed of the same material and are coupled to the structural portion 300 such that their bases 320 are received in an associated gap 316. It will also be appreciated from this disclosure that in the alternative, the resilient members 302 may be formed differently (e.g., with different materials, different sizes and/or different cross-sections).

With reference to FIGS. 1, 4 and 8, it will be further appreciated from this disclosure that the mass and the stiffness of the liner(s) 204 are tuned to the driveline 16 such that the liner(s) 204 acts or act as (a) a tuned resistive absorber for attenuating shell mode vibrations; and (b) as one or more of (i) a tuned reactive absorber for attenuating bending mode vibrations, and (ii) a tuned reactive absorber for attenuating torsion mode vibrations. The liner(s) 204 may be tuned such that a ratio of the mass of the liner(s) 204 to a mass of the shaft member 200 is about 5% to about 30%. In the particular example provided, the ratio of the mass of the liners 204 to the mass of the shaft member 200 is about 16.9%.

Preferably, the liner(s) 204 is/are tuned to a natural frequency corresponding to at least one of a first shell mode, a second shell mode and a third shell mode. Where the liner(s) 204 is/are employed to attenuate bending mode vibrations, they are preferably tuned to a natural frequency corresponding to at least one of a first bending mode, a second bending mode and a third bending mode of the propshaft assembly 20 as installed to the driveline 16. Where the liner(s) 204 is/are employed to attenuate torsion mode vibrations, they are preferably tuned to a natural frequency of the driveline 16 in a torsion mode, such as to a frequency that is less than or equal to about 600 Hz.

It will also be appreciated from this disclosure that various characteristics of the liner 204 can be controlled to tune its damping properties in the shell mode and in one or both of the bending mode and the torsion mode. In the particular example provided, the following variables were controlled: mass, length and outer diameter of the liner 204, diameter and wall thickness of the structural portion 300, material of which the structural portion 300 was fabricated, the quantity of the resilient members 302, the material of which the resilient members 302 was fabricated, the helix angle 330 and pitch 332 with which the resilient members 302 are fixed to the structural portion 300, the configuration of the lip member(s) 322 of the resilient member 302, and the location of the liners 204 within the shaft member 200. In the particular example provided:

the shaft member 200 can have an outside diameter of about 4.0 inches, a wall thickness of about 0.08 inch, a length of about 64 inches, and can have a mass of about 3.2 kg;

the liners 204 can have an outer diameter (over the resilient member(s) 302) of about 4.0 inches, a length of about 14 inches, a mass of about 270 grams, the structural portion 300 of the liner 204 can be formed of paperboard and can have a wall thickness of about 0.07 inch and an inner diameter of about 3.56 inch, one resilient member 302 can be coupled to the structural portion 300 at a helix angle 330 of about 22.5° and a pitch 332 of about 4.5 inches, the resilient member 302 can have a single lip member 322 and can be formed of a silicon material that conforms to ASTM D2000 M2GE505 having a durometer of about 45 Shore A to about 55 Shore A; and each of the liners 204 can be inserted into an associated end of the shaft member 200 such that they are disposed generally symmetrically about an associated one of the second (n=2) bending nodes 230 (FIG. 4).

It will be appreciated that in certain situations it may not be possible to exactly tune the liner 204 to the two or more relevant frequencies associated with a given propshaft assembly 20, as when a particular liner 204 is used across a family of propshaft assemblies. As such, it will be understood that a liner 204 will be considered to be tuned to a relevant frequency if it is effective in attenuating vibration at the relevant frequency. For example, the liner 204 can be considered to be tuned to a relevant frequency if a frequency at which it achieves maximum attenuation is within ±20% of that relevant frequency. Preferably, the liner 204 is considered to be tuned to the relevant frequency if the frequency at which it achieves maximum attenuation is within ±15% of the relevant frequency. More preferably, the liner 204 is considered to be tuned to the relevant frequency if the frequency at which it achieves maximum attenuation is within ±10% of the relevant frequency. Still more preferably, the liner 204 is considered to be tuned to the relevant frequency if the frequency at which it achieves maximum attenuation is within ±5% of the relevant frequency.

As another example, the liner 204 can be considered to be tuned to a relevant shell mode frequency if it damps shell mode vibrations by an amount that is greater than or equal to about 2%.

While the propshaft assembly 20 has been described thus far as including a liner 204 having a resilient member 302 that is disposed helically about and along a structural portion 300, it will be appreciated that the methodology of the present disclosure, in its broader aspects, may be performed somewhat differently. In this regard, the liner can be constructed as shown in FIGS. 10 through 14.

In FIG. 10, for example, the liner 204a includes a plurality of circumferentially-extending resilient members 302a that are coupled to the structural portion 300a. The resilient members 302a are spaced apart from one another along the longitudinal axis of the structural portion 300a. It will be appreciated that while the resilient members 302a are illustrated as having a generally flat outer surface, they could be formed to include one or more lip members (similar to the lip member 322 of FIG. 9). In such case, the lip member(s) may be extend in a desired manner, such as circumferentially.

In FIG. 11, the liner 204b includes a plurality of longitudinally-extending resilient members 302b that are coupled to the structural portion 300b. The resilient members 302b are spaced circumferentially apart from one another about the circumference of the structural portion 300b. It will be appreciated that while the resilient members 302b are illustrated as having an arcuate outer surface, they could be formed to include one or more lip members (similar to the lip member 322 of FIG. 9). In such case, the lip member(s) may be extend in a desired manner, such as longitudinally.

In FIG. 12, the liner 204c includes a resilient member 302c that covers substantially the entire outer surface of the structural portion 300c. The resilient member 302c can be a discrete component that is separately formed and thereafter assembled to the structural portion 300c. In this regard, the resilient member 302c can be formed as a sheet and then bonded to outer surface of the structural portion 300c via a suitable adhesive. Alternatively, the resilient member 302c could be overmolded onto the structural portion 300c.

The liner 204d of FIG. 13 is similar to the liner 204c of FIG. 12 except that a plurality of void spaces 400 may be formed into the resilient member 302d to control the stiffness of the liner 204d in a desired direction. While the void spaces 400 are illustrated to be diamond-shaped holes that extend completely through the resilient member 302d, it will be appreciated that the void spaces 400 need not extend completely through the resilient member 302d and thus could form blind holes, channels and/or grooves. Moreover, it will be appreciated that the void spaces 400 may be shaped and arranged in any desired manner.

The liner 204e of FIG. 14 can be similar to the liner 204d of FIG. 13, except that the resilient member 302e includes a plurality of fingers 450. Each finger 450 can be shaped in a desired manner, such as a prism, a pyramid, a cylinder, a cone, a plinth, or as a portion of a doubled-curved surface, such as a sphere, torus or ellipsoid. It may be beneficial to shape the fingers 450 in the shape of a prism, especially a rectangular parallelepiped, so as to more easily tailor the stiffness of the fingers 450 in two or more directions. In this regard, the width and depth of the cross section of the fingers 450 and the height of the fingers 450 may be controlled independently of one another.

In some situations it may be beneficial to chill the liners prior to their installation to a shaft member to reduce the overall diameter of the liner and/or to provide sufficient rigidity to the resilient member(s).

It may also be beneficial in some situations to provide a secondary means for retaining the liner to the shaft member. The secondary means can be employed to resist or inhibit axial movement of the liner within the shaft member and can comprise a structure that is axially offset from the liner and coupled to the shaft member. The structure can be configured to effectively reduce the inside diameter of the shaft member at a desired location to an extent that resists or inhibits axial movement of the liner. The structure can be formed via an adhesive, a weld, a dimple, or a necked-down (e.g., rotary swaged) section, for example.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this invention, but that the scope of the present disclosure will include any embodiments falling within the foregoing description and the appended claims.

What is claimed is:

1. A method for manufacturing a shaft assembly of a driveline system, the driveline system further including a first driveline component and a second driveline component, the shaft assembly being adapted to transmit torque between the first driveline component and the second driveline component, the method comprising:
providing a hollow shaft member;
tuning at least one liner to attenuate a plurality of types of vibration transmitted through the shaft member; and
positioning the at least one liner within the shaft member such that the at least one liner is configured to damp shell mode vibrations in the shaft member by an amount that is greater than or equal to about 2%, and the at least one liner is also tuned to within about ±20% of a natural frequency of the driveline system in a torsion mode.

2. The method of claim 1 wherein the at least one liner is tuned within ±15% of the natural frequency of the driveline system in the torsion mode.

3. The method of claim 2, wherein the at least one liner is tuned to within ±10% of the natural frequency of the driveline system in the torsion mode.

4. The method of claim 3, wherein the at least one liner is tuned to within ±5% of the natural frequency of the driveline system in the torsion mode.

5. The method of claim 1, wherein the shell mode is at least one of a first shell mode, a second shell mode and a third shell mode.

6. The method of claim 1, wherein the natural frequency of the driveline system in the torsion mode is below about 600 Hz.

7. The method of claim 1, wherein the at least one liner includes a structural portion and at least one resilient member that is coupled to the structural portion, the liner being inserted to the shaft member such that a wall of the shaft member contacts the at least one resilient member.

8. The method of claim 7, wherein the at least one resilient member extends helically about and along the structural portion.

9. The method of claim 7, wherein the at least one resilient member extends longitudinally along the structural portion.

10. The method of claim 7, wherein the at least one resilient member extends circumferentially about the structural portion.

11. The method of claim 7, wherein a first one of the resilient members is formed of a first material and a second one of the resilient members is formed of a second material that is different from the first material.

12. The method of claim 7, wherein the structural portion is formed of a material selected from a group consisting of cardboard, plastic resin, carbon fiber, fiberglass, metal and combinations thereof.

13. The method of claim 7, wherein the at least one resilient member is overmolded to the structural portion.

14. The method of claim 7, wherein the at least one resilient member includes a plurality of fingers, the fingers being disposed between the structural portion and the shaft member.

15. The method of claim 1, wherein a first one of the liners is positioned along the shaft member symmetrically about a bending anti-node.

16. The method of claim 15, wherein a second one of the liners is positioned along the shaft member symmetrically about another bending anti-node.

17. A method for manufacturing a shaft assembly of a driveline system, the driveline system further including a first driveline component and a second driveline component, the shaft assembly being adapted to transmit torque between the first driveline component and the second driveline component, the method comprising:
providing a hollow shaft member;
providing a liner tuned to attenuate a plurality of types of vibration transmitted through the shaft member; and
positioning the liner within the shaft member to damp shell mode vibrations by an amount that is greater than or equal to about 2%, and wherein the liner is also tuned to within about ±20% of a natural frequency of the driveline system in at least one of a bending mode and a torsion mode.

18. The method of claim 17 wherein the liner is tuned within ±15% of the natural frequency of the driveline system in at least one of the bending mode and the torsion mode.

19. The method of claim 17, wherein the liner is tuned to within ±10% of the natural frequency of the driveline system in at least one of the bending mode and the torsion mode.

20. The method of claim 17, wherein the liner is tuned to within ±5% of the natural frequency of the driveline system in at least one of the bending mode and the torsion mode.

21. The method of claim 17, wherein the shell mode is at least one of a first shell mode, a second shell mode and a third shell mode.

22. The method of claim 17, wherein the natural frequency of the driveline system in the torsion mode is below about 600 Hz.

23. The method of claim 17, wherein the liner includes a structural portion and at least one resilient member that is coupled to the structural portion, the liner being inserted to the shaft member such that a wall of the shaft member contacts the at least one resilient member.

24. The method of claim 23, wherein the at least one resilient member extends helically about and along the structural portion.

25. The method of claim 23, wherein the at least one resilient member extends longitudinally along the structural portion.

26. The method of claim 23, wherein the at least one resilient member extends circumferentially about the structural portion.

27. The method of claim 23, wherein a first one of the resilient members is formed of a first material and a second one of the resilient members is formed of a second material that is different from the first material.

28. The method of claim 23, wherein the structural portion is formed of a material selected from a group consisting of cardboard, plastic resin, carbon fiber, fiberglass, metal and combinations thereof.

29. The method of claim 23, wherein the at least one resilient member is overmolded to the structural portion.

30. The method of claim 23, wherein the at least one resilient member includes a plurality of fingers, the fingers being disposed between the structural portion and the shaft member.

31. A method of manufacturing a shaft assembly used in a vehicular driveline system for transmitting torque between first and second driveline components, the method comprising:
providing a shaft member having a hollow central cavity;
providing a liner tuned to attenuate shell mode vibrations and torsion mode vibrations transmitted through the shaft member; and
positioning the liner within the central cavity so as to damp the shell mode vibrations by an amount greater than or equal to 2% and to damp the torsion mode vibrations by tuning the liner to within about ±20% of a torsion mode natural frequency of the shaft assembly.

32. The method of claim 31 wherein the liner is further configured to damp bending mode vibrations in the shaft member, and wherein the liner is tuned to within about ±20% of a bending mode natural frequency of the shaft assembly.

33. The method of claim 31 wherein the liner is tuned such that a ratio of the mass of the liner to the mass of the shaft member is in the range of about 5% to 30%.

34. The method of claim 31, wherein the liner includes a structural portion and at least one resilient member that is coupled to the structural portion, and wherein the liner is inserted into the central cavity of the shaft member such that a wall of the shaft member contacts the at least one resilient member.

35. The method of claim 34, wherein the at least one resilient member extends helically about and along the structural portion.

36. The method of claim 34, wherein the at least one resilient member extends longitudinally along the structural portion.

37. The method of claim 34, wherein the at least one resilient member extends circumferentially about the structural portion.

38. The method of claim 34, wherein the at least one resilient member includes a plurality of fingers, the fingers being disposed between the structural portion and the shaft member.

* * * * *